United States Patent
Furukawa et al.

(10) Patent No.: US 6,343,062 B1
(45) Date of Patent: Jan. 29, 2002

(54) OPTICAL DISK DEVICE AND OPTICAL DISK FOR RECORDING AND REPRODUCING HIGH-DENSITY SIGNALS

(75) Inventors: Shigeaki Furukawa; Kenichi Nishiuchi, both of Osaka; Takashi Ishida, Kyoto, all of (JP)

(73) Assignee: Matsushita Electric Industrial Co., Ltd, Osaka (JP)

(*) Notice: Subject to any disclaimer, the term of this patent is extended or adjusted under 35 U.S.C. 154(b) by 0 days.

(21) Appl. No.: 09/152,028

(22) Filed: Sep. 11, 1998

(30) Foreign Application Priority Data

Sep. 26, 1997 (JP) .............................. 9-261621

(51) Int. Cl.[7] .................................. G11B 7/00
(52) U.S. Cl. .............................. 369/275.4; 369/275.3; 369/53.2
(58) Field of Search .............................. 369/32, 33, 47, 369/48, 54, 58, 124.07, 124.08, 275.4, 47.23, 47.24, 47.25, 47.27, 47.28, 47.31, 53.2, 53.22, 53.29, 53.31, 53.39, 53.41, 53.44, 124.14, 275.3, 44.29, 44.32, 44.26, 44.35, 44.28

(56) References Cited

U.S. PATENT DOCUMENTS

| | | | |
|---|---|---|---|
| 4,461,807 A | 7/1984 | Mori et al. |
| 4,606,018 A | 8/1986 | Sugiki et al. |
| 4,637,976 A | 1/1987 | Terao et al. |
| 4,661,420 A | 4/1987 | Nakamura et al. |
| 4,670,345 A | 6/1987 | Morimoto et al. |
| 4,680,742 A | 7/1987 | Yamada et al. |
| 4,744,055 A | 5/1988 | Hennessey |
| 4,913,949 A | 4/1990 | Steininger et al. |
| 4,954,379 A | 9/1990 | Nishida et al. |
| 4,984,231 A | 1/1991 | Yasuoka et al. |
| 5,098,761 A | 3/1992 | Watanabe et al. |
| 5,108,846 A | 4/1992 | Steininger |
| 5,194,363 A | 3/1993 | Yoshioka et al. |
| 5,221,588 A | 6/1993 | Morimoto et al. |
| 5,283,133 A | 2/1994 | Tsutsumi et al. |

(List continued on next page.)

FOREIGN PATENT DOCUMENTS

| | | |
|---|---|---|
| EP | 0 375 700 | 7/1990 |
| EP | 0 499 273 | 8/1992 |
| EP | 0 588 305 | 3/1994 |
| EP | 0 594 277 | 4/1994 |
| EP | 0 837 017 | 2/1995 |
| EP | 0 644 537 | 3/1995 |
| EP | 0 706 177 | 4/1996 |
| EP | 0 732 690 | 9/1996 |
| EP | 0 825 595 | 2/1998 |
| EP | 0 849 729 | 6/1998 |

(List continued on next page.)

OTHER PUBLICATIONS

The Merck Index, front cover, Merk Co., Inc.

*Primary Examiner*—Paul W. Huber
(74) *Attorney, Agent, or Firm*—Merchant & Gould

(57) ABSTRACT

An optical disk device comprising a converging optical system in which a laser beam is irradiated onto an optical disk having a recording thin film on a substrate provided with uneven guide grooves and a tracking controller that controls tracking so that the laser beam converged by the converging optical system scans a convex part or a concave part of the guide groove, wherein the tracking controller controls tracking polarity so that the tracking polarity is inverted according to the depth of the guide groove. As a result, in optical disks having any groove depth, a laser beam can scan a target groove track or a target land groove track correctly.

14 Claims, 9 Drawing Sheets

U.S. PATENT DOCUMENTS

| | | |
|---|---|---|
| 5,289,453 A | 2/1994 | Ohno et al. |
| 5,294,523 A | 3/1994 | Nagata et al. |
| 5,395,735 A | 3/1995 | Nagata et al. |
| 5,418,030 A | 5/1995 | Tominaga et al. |
| 5,424,106 A | 6/1995 | Yamada et al. |
| 5,431,978 A | 7/1995 | Nakamura et al. |
| 5,442,619 A | 8/1995 | Van Uijen et al. |
| 5,448,551 A | 9/1995 | Miyagawa et al. |
| 5,459,019 A | 10/1995 | Kato et al. |
| 5,484,686 A | 1/1996 | Maeda et al. |
| 5,521,901 A | 5/1996 | Okada et al. |
| 5,545,454 A | 8/1996 | Yamada et al. |
| 5,580,632 A | 12/1996 | Ohkawa et al. |
| 5,581,539 A | 12/1996 | Horie et al. |
| 5,591,501 A | 1/1997 | Ovshinsky et al. |
| 5,652,037 A | 7/1997 | Ohkawa et al. |
| 5,726,969 A | 3/1998 | Moriya et al. |
| 5,733,622 A | 3/1998 | Starcke et al. |
| 5,745,475 A | 4/1998 | Ohno et al. |
| 5,764,619 A | 6/1998 | Nishiuchi et al. |
| 5,776,574 A | 7/1998 | Honguh et al. |
| 5,787,061 A | 7/1998 | Tsuchiya et al. |
| 5,811,217 A | 9/1998 | Akahira et al. |
| 5,818,808 A | 10/1998 | Takada et al. |
| 5,878,018 A | 3/1999 | Moriya et al. |
| 5,882,759 A | 3/1999 | Hirotsune et al. |
| 5,914,214 A | 6/1999 | Ohta et al. |
| 5,958,649 A | 9/1999 | Hirotsune |
| 5,976,659 A | 11/1999 | Abiko |
| 6,004,646 A | 12/1999 | Ohno et al. |
| 6,096,399 A | 8/2000 | Yoshinara |
| 6,153,063 A | 11/2000 | Yamada et al. |

FOREIGN PATENT DOCUMENTS

| | | |
|---|---|---|
| JP | 56-145530 | 11/1981 |
| JP | 57-50330 | 3/1982 |
| JP | 61-89889 | 5/1986 |
| JP | 62-196181 | 8/1987 |
| JP | 63-50931 | 3/1988 |
| JP | 63-63153 | 3/1988 |
| JP | 63-103453 | 5/1988 |
| JP | 63-151486 | 6/1988 |
| JP | 63-171453 | 7/1988 |
| JP | 1-211249 | 8/1989 |
| JP | 1-276453 | 11/1989 |
| JP | 2-037548 | 2/1990 |
| JP | 2-78041 | 3/1990 |
| JP | 2-105351 | 4/1990 |
| JP | 2-265051 | 10/1990 |
| JP | 2-265052 | 10/1990 |
| JP | 3-40244 | 2/1991 |
| JP | 3-104038 | 5/1991 |
| JP | 3-113844 | 5/1991 |
| JP | 3-248338 | 11/1991 |
| JP | 4-52188 | 2/1992 |
| JP | 4-069833 | 3/1992 |
| JP | 4-102243 | 4/1992 |
| JP | 4-143937 | 5/1992 |
| JP | 4-219650 | 8/1992 |
| JP | 4-321948 | 11/1992 |
| JP | 5-2769 | 1/1993 |
| JP | 5-62193 | 3/1993 |
| JP | 5-159360 | 6/1993 |
| JP | 5-217211 | 8/1993 |
| JP | 5-274726 | 10/1993 |
| JP | 5-282705 | 10/1993 |
| JP | 5-290408 | 11/1993 |
| JP | 5-298747 | 11/1993 |
| JP | 5-298748 | 11/1993 |
| JP | 5-325261 | 12/1993 |
| JP | 6-195747 | 7/1994 |
| JP | 7-21583 | 1/1995 |
| JP | 7-105574 | 4/1995 |
| JP | 7-326073 | 12/1995 |
| JP | 8-85261 | 4/1996 |
| JP | 8-190734 | 7/1996 |
| JP | 8-329528 | 12/1996 |
| JP | 8-329529 | 12/1996 |
| JP | 10-49916 | 2/1998 |
| JP | 4-78032 | 3/1999 |
| WO | WO 96/00441 | 1/1996 |
| WO | WO 97/34298 | 9/1997 |

OPTICAL DISK DEVICE AND OPTICAL DISK FOR RECORDING AND REPRODUCING HIGH-DENSITY SIGNALS

FIELD OF THE INVENTION

This invention relates to an optical disk and an optical disk device for recording and reproducing high-density signals by irradiating high-energy beams such as laser beams or the like onto a thin film formed on a substrate.

BACKGROUND OF THE INVENTION

Recently, optical disks on which information can be recorded and from which the information can be reproduced and erased and optical disk devices that can record information on and reproduce information from the optical disks have been commercialized. Furthermore, high-density rewritable optical disks and optical disk devices capable of recording and reproducing high-quality animation have been actively researched and developed.

Well-known rewritable optical disks include phase-change optical disks with chalcogenide thin films on a disc-shape substrate. The chalcogenide thin films comprise, for example, Ge—Sb—Te, In—Se, or the like. Magneto-optical recording media having metal thin films such as Fe—Tb—Co as their recording layers also are well known.

In phase-change optical disks, for example, laser beams are irradiated onto and focused on recording thin films comprising the above-mentioned phase-change materials to heat the irradiated parts partially to a predetermined temperature. When the temperature of the irradiated portion becomes equal to or higher than the crystalline temperature, the irradiated portion is changed to the crystalline state. When the irradiated portion is melted at a temperature higher than its melting point and is quenched, its state is changed to the amorphous state. Once either the crystalline state or the amorphous state is determined so as to correspond to the recording state, and the other to the erasing state (unrecorded state), information can be recorded or erased reversibly by forming each state according to a pattern corresponding to information signals. Since the crystalline state and the amorphous state are different from each other in their optical characteristics, recorded signals can be reproduced by optically detecting such different characteristics as a reflectivity change or a transmittance change.

In a magneto-optical recording medium, for example, laser beams are irradiated onto and focused on a magneto-optical recording thin film to heat the irradiated portions partially to a predetermined temperature. While heating the irradiated portions, a magnetic field also is applied. The magnetizing direction of the magneto-optical recording thin film is reversed according to information, thus recording and erasing the information.

In such optical disks mentioned above, a substrate is grooved in advance so as to be provided with uneven guide grooves (hereafter also referred to as "guide tracks"), thus forming information tracks. In an uneven guide groove, an information track nearer to a light-incidence side is referred to as a "groove", and an information track further from the light-incidence side is referred to as a "land". Information signals are recorded or reproduced by focusing laser beams on the groove or the land and scanning it. These information signals can be recorded by users themselves, thus being referred to as "user data".

In common commercial optical disks, information signals are recorded either on a groove or on a land, and the other serves as a guard band that separates adjoining tracks.

Means for increasing recording capacity in optical disks include a technique for increasing track density by recording information signals on both groove tracks and land tracks as described in Examined Japanese Patent Application Tokkou Sho 63-57859.

In order further to increase the track density, there is a method of making the track pitch of guide tracks smaller while recording information on both the land tracks and the groove tracks mentioned above. In this case, in order to cut off the heat transfer from a track heated by laser beams to the adjacent track, a technique for making guide grooves deeper can be applied.

On the other hand, in rewritable optical disks, it is necessary to record address signals as uneven pits that indicate position information on a medium or the like in advance. As a means for recording the address signals, an intermediate address method is proposed in, for example, Unexamined Japanese Patent Application Tokkai Hei 6-176404.

An optical-beam tracking control method for reading information from an optical disk will be explained with reference to drawings as follows.

FIG. 7 is a schematic block diagram of a conventional optical disk device. An information track 501 is formed on an optical disk 500.

FIG. 8 is an enlarged view of the information track 501. The information track 501 comprises a groove track 606 and a land track 607. The information track 501 has a data area 602 for recording information and an address area (an identifying signal area) 601 in which position information of an information track and the like are recorded. The groove track 606 and the land tracks 607 are arranged alternately at an interval of a track pitch Tp. Prepits 604 of projection or pit are formed in the address area (the identifying signal area) 601. The center of a prepit 604 is arranged at a position shifted from the center of the groove track 606 in the radial direction of the optical disk by Tp/2. The arrangement of these prepits 604 enables the address signals to be reproduced from both the groove track and the land track. Generally, the depth or height of the prepits 604 is the same as the depth of the groove in the data area 602.

In FIG. 8, recording marks 605 are formed on both the groove track 606 and the land tracks 607. A beam spot 502 scans the groove track 606 and the land tracks 607 in the direction shown by an arrow.

Referring to FIG. 7, the operation during reproducing information recorded on the optical disk 500 will be explained.

A laser driving circuit 525 receives a signal L3 from a controller 518 to be changed to a reproducing mode and outputs a driving current to a semiconductor laser 510, which results in emission at a constant reproducing intensity.

As a next step, the beam-spot position in the focus direction is controlled. For this purpose, a general focus controlling method such as a spot size method or an astigmatism method may be used. Therefore, a detailed explanation of the method is not necessary herein.

A laser beam emitted from the semiconductor laser 510 provided to an optical head 514 is focused on the information track 501 by an objective lens 511. A laser beam reflected from the information track 501 enters a photodetector 512 after receiving information recorded on the information track 501 according to the reflected-light quantity distribution. Light receivers 512a and 512b comprised in the photodetector 512 convert the change in the light quantity distribution of the incident optical beam into electric signals. Each of the light receivers 512a and 512b output the electric signals to a differential amplifier 515 and a summing amplifier 521. After converting each input current into voltage, the differential amplifier 515 outputs a differential signal obtained by differentiation to a LPF (low pass filter) 516. The LPF 516 extracts a low-frequency component from the differential signal and outputs it as a signal S1 to a polarity inverting circuit 517.

The polarity inverting circuit 517 outputs a signal S2 to a tracking control circuit 519 by transmitting the signal S1 without polarity change or inverting the polarity of the signal S1 according to a control signal L1 from the controller 518. The signal S2 is a so-called push-pull signal and corresponds to a tracking error quantity between the beam spot 502 and the information track 501. In this case, when the track on which information should be recorded (or erased, hereafter the same) or from which information should be reproduced is a groove, the polarity inverting circuit 517 transmits the signal S1 without polarity change. On the other hand, when the track on which information should be recorded or from which information should be reproduced is a land, the polarity inverting circuit 517 inverts the polarity of the signal S1.

The tracking control circuit 519 outputs a tracking driving signal to an actuator driving circuit 520 according to the level of the input signal S2. The actuator driving circuit 520 outputs a driving current to an actuator 513 according to the tracking driving signal, thus shifting the objective lens 511 in the direction crossing the information track 501. This control allows the beam spot 502 to scan the center of a target groove or land of the information track.

When the beam spot 502 scans the information track 501 correctly, the quantity of the light reflected from the prepits 604 varies from the quantity of the light reflected from the recording marks 605 (see FIG. 8) due to the optical interference, thus changing the level of the output signals of the light receivers 512a and 512b. These output signals are added in the summing amplifier 521 to obtain a summed signal, and the summed signal is output to a preamplifier 522. The signal amplified by the preamplifier 522 is demodulated to reproduced data by a reproduced signal processing circuit 523. The reproduced data are output to the controller 518.

On the other hand, in recording, the laser driving circuit 525 receives a signal L3 from the controller 518 and is changed to a recording mode. At the same time, a recording signal processing circuit 524 receives a recording data signal L2 from the controller 518 and outputs a modulating signal to the laser driving circuit 525. The laser driving circuit 525 modulates the driving current output to the semiconductor laser 510 according to the modulating signal. Thus, the intensity of the beam spot 502 varies and a recording mark is formed on the information track 501.

During each operation mentioned above, a spindle motor 530 rotates the optical disk 500 at a constant angular or linear velocity.

However, in such a conventional optical disk device as described above, the polarity of the signal S1 is inverted according to the groove depth of the information track 501 and therefore tracking of a target groove track or a target land track cannot be controlled in some cases.

FIG. 9 shows the relationship between a groove depth of an information track and signal amplitude of a tracking error signal according to a push-pull method. The signal amplitude of a tracking error signal is maximum at a groove depth of $\lambda/8n$ and zero at a groove depth of $\lambda/4n$, wherein $\lambda$ is a wavelength of a laser beam used for recording and reproduction, and n is the refractive index of a substrate. The amplitude increases when changing the groove depth from $\lambda/4n$ toward $3\lambda/8n$. However, the diffraction direction of a reflected light is reversed, thus reversing operating signals in the light receivers 512a and 512b. The tracking-error signal amplitude and the intensity distribution of the reflected light are repeated at a $\lambda/2$ period. Thus, in conventional optical disk devices, the polarity of the push-pull signal, i.e. the polarity of S1 output from the differential amplifier 515 is inverted according to the groove depth of the information track 501.

In the above description, the polarity of the tracking signal is inverted at a groove depth of $\lambda/4n$. However, the groove depth at which the polarity is inverted depends on the groove shape. That is, only when the boundary wall surface between the land track 607 and the groove track 606 of the information track 501 is perpendicular to the optical disk surface, is the tracking polarity inverted at a period of $\lambda/4n$ in groove depth. Therefore, when the boundary wall surface between the land track and the groove track is oblique to the optical disk surface, the polarity of the tracking signal is inverted at a groove depth slightly deeper than $\lambda/4n$.

In FIG. 7, suppose that the polarity inverting circuit 517 controls the polarity of the signal S1 by transmitting the signal S1 without polarity change when scanning a groove track on the optical disk 500 having any groove depth (for example, a groove depth of $\lambda/6n$) within the range of 0 to $\lambda/4n$, and by inverting the polarity of the signal S1 so as to have negative polarity when scanning a land track on the optical disk 500 mentioned above.

However, when scanning an optical disk having any groove depth within the range of $\lambda/4n$ to $\lambda/2n$ in this control method, the polarity of the signal S1 is the reverse of that when scanning an optical disk having a groove depth of $\lambda/6n$. If the switching of the tracking polarity for a groove track and a land track is controlled by the conventional control method without any change, when trying to make the beam spot 502 track the groove track, the land track is tracked. The reason is that the polarity inverting circuit 517 transmits the signal S1 without polarity change and therefore the polarity of the signal S2 becomes negative. On the other hand, when trying to make the beam spot 502 track the land track, the groove track is tracked. The reason is that the polarity inverting circuit 517 inverts the polarity of the signal S1 and therefore the polarity of the signal S2 becomes positive.

In other words, the tracking polarity in scanning a groove track and a land track is inverted according to the groove depth of the information track 501, thus causing a problem in that a target track cannot be tracked.

Such a problem hinders information from being recorded on and from being reproduced from the optical disk mentioned above in which track density is improved by recording information on both the land tracks and the groove tracks and the heat transfer to an adjacent track is controlled by making the guide-groove depth deeper.

When scanning an address area, the polarity of an output signal of the differential amplifier 515 also is inverted due to the change in height or depth of the prepits 604. Therefore, when forming the prepits 604 so as to have the same depth as that of uneven grooves in the data area 602, there has been a problem that the compatibility as to the information obtained from the address area can not be kept among disks, each of which has a different groove depth.

SUMMARY OF THE INVENTION

An object of the present invention is to solve the problems described above and to provide an optical disk and an optical disk device in which tracking of a target groove track or a target land track can be controlled regardless of the guide-groove depth by detecting the inversion in tracking polarity according to a groove depth in advance (this is hereafter referred to as a "first object").

Another object of the present invention is to provide an optical disk in which the reverse in recording and reproducing conditions about, for example, irradiation and a modulation pattern, and the like of a beam spot on land tracks and groove tracks can be compensated regardless of the guide-groove depth, even if tracking polarity is inverted (this is hereafter referred to as a "second object").

Still another object of the present invention is to provide an optical disk in which the compatibility in the information obtained from an address area can be kept regardless of the groove depth of an information track (this is hereafter referred to as a "third object").

In order to attain the first object mentioned above, optical disk devices of the present invention have the following configurations.

An optical disk device according to a first configuration of the present invention comprises a converging optical system and a tracking controller. In the converging optical system, a laser beam is irradiated onto an optical disk having a recording thin film on a substrate provided with uneven guide grooves. The tracking controller controls tracking so that the laser beam converged by the converging optical system scans a convex part or a concave part of the guide groove mentioned above. The tracking controller controls the inversion in tracking polarity according to the depth of the guide groove.

An optical disk device according to a second configuration of the present invention comprises a converging optical system, a tracking controller, a polarity inverting system, and a disk discriminating system. In the converging optical system, a laser beam is irradiated onto an optical disk having a recording thin film on a substrate provided with uneven guide grooves. The tracking controller controls tracking so that the laser beam converged by the converging optical system scans a convex part or a concave part of the guide groove mentioned above. The polarity inverting system inverts the polarity of the tracking controller. The disk discriminating system discriminates the depth of the guide grooves. According to the result obtained from the disk discrimination system, the polarity inverting system inverts the polarity of the tracking controller.

According to the optical disk device of the first or second configuration of the present invention, the tracking controller inverts the tracking polarity according to the depth of the guide groove, or the polarity inverting system inverts the polarity of the tracking controller according to the result obtained by discriminating the depth of the guide groove by the disk discriminating system. Therefore, it is possible to make a laser beam scan a target groove track or a target land track on optical disks with any groove depth correctly. Consequently, information can be correctly recorded on or reproduced from optical disks with a different guide-groove depth.

In order to attain the first object mentioned above, optical disks of the present invention have the following structures.

An optical disk according to a first structure of the present invention comprises a substrate on which uneven guide grooves are formed. The optical disk is contained in a cartridge. The cartridge is provided with identification data about the depth of the guide grooves and/or identification data about the tracking polarity of a reproducing optical system.

An optical disk according to a second structure of the present invention comprises a substrate on which uneven guide grooves are formed. In an identifying signal area provided on the optical disk, information about the depth of the guide grooves and/or information about the tracking polarity of a reproducing optical system are/is recorded.

According to the optical disks of the first and second structures mentioned above, the information about the depth of the guide grooves and/or the information about the tracking polarity of a reproducing optical system are/is recorded in the cartridge or in the identifying signal area. Therefore, since an optical disk device reads such information prior to recording or reproduction, tracking can be controlled according to the guide-groove depth. Consequently, it is possible to make a laser beam scan a target groove track or a target land track on optical disks with any groove depth correctly. Thus, information can be correctly recorded on or reproduced from optical disks with a different guide-groove depth.

An optical disk according to a third structure of the present invention comprises a substrate on which uneven guide grooves are provided. The uneven guide grooves have a depth of at least $(m+1)\lambda/4n$ but less than $(m+2)\lambda/4n$, wherein $\lambda$ is a wavelength of a laser beam used for recording or reproduction, n indicates the refractive index of the substrate, and m is 0 or a positive even number. Information about the tracking polarity of a reproducing optical system is recorded in a control area on the optical disk.

An optical disk according to a fourth structure of the present invention comprises a substrate on which uneven guide grooves are provided. The uneven guide grooves have a depth of at least $(m+1)\lambda/4n$ but less than $(m+2)\lambda/4n$, wherein $\lambda$ is a wavelength of a laser beam used for recording or reproduction, n indicates the refractive index of the substrate, and m is 0 or a positive even number. Information about the depth of the guide grooves is recorded in a control area on the optical disk.

An optical disk according to a fifth structure of the present invention comprises a substrate on which uneven guide grooves are provided. The uneven guide grooves have a depth of at least $(m+1)\lambda/4n$ but less than $(m+2)\lambda/4n$, wherein $\lambda$ is a wavelength of a laser beam used for recording or reproduction, n indicates the refractive index of the substrate, and m is 0 or a positive even number. The optical disk comprises address areas where positions of the guide grooves are identified. Information about the tracking polarity of a reproducing optical system is recorded in the address areas.

An optical disk according to a sixth structure of the present invention comprises a substrate on which uneven guide grooves are provided. The uneven guide grooves have a depth of at least $(m+1)\lambda/4n$ but less than $(m+2)\lambda/4n$, wherein $\lambda$ is a wavelength of a laser beam used for recording or reproduction, n indicates the refractive index of the substrate, and m is 0 or a positive even number. The optical disk comprises address areas where positions of the guide grooves are identified. Information about the depth of the guide grooves is recorded in the address areas.

According to the optical disks of the third to sixth structures mentioned above, in the optical disk on which guide grooves having a depth of at least $(m+1)\lambda/4n$ but less than (m+2)λ/4n are formed, the information about the tracking polarity of a reproducing optical system or the information on the depth of the guide grooves is recorded in the control area or in the address areas. Therefore, an optical disk device reads such information prior to recording or reproduction, thus controlling tracking according to the guide-groove depth. Consequently, it is possible to make a laser beam scan a target groove track or a target land track on an optical disk with such a depth correctly. Thus, information can be recorded or reproduced correctly.

Furthermore, in order to attain the second object mentioned above, optical disks of the present invention have the following structures.

An optical disk according to a seventh structure of the present invention comprises a substrate on which uneven guide grooves are provided. The uneven guide grooves have a depth of at least (m+1)λ/4n but less than (m+2)λ/4n, wherein λ is a wavelength of a laser beam used for recording or reproduction, n indicates the refractive index of the substrate, and m is 0 or a positive even number. In the optical disk, signals are recorded on both convex parts and concave parts of the guide grooves. The optical disk is compatible with an optical disk having uneven guide grooves with a depth of at least mλ/4n but less than (m+1)λ/4n. The optical disk according to the seventh structure comprises a control area where convex-part recording- and reproducing-information and concave-part recording- and reproducing-information are recorded. The convex-part recording- and reproducing-information is recorded in an area where concave-part recording- and reproducing-information is recorded in an optical disk having a groove depth of at least m λ/4n but less than (m+1)λ/4n. The concave-part recording-and reproducing-information is recorded in an area where convex-part recording- and reproducing-information is recorded in an optical disk having so a groove depth of at least mλ/4n but less than (m+1)λ/4n.

An optical disk according to an eighth structure of the present invention comprises a substrate on which uneven guide grooves are provided. The uneven guide grooves have a depth of at least (m+1)λ/4n but less than (m+2)λ/4n, wherein λ is a wavelength of a laser beam used for recording or reproduction, n indicates the refractive index of the substrate, and m is 0 or a positive even number. In the optical disk, signals are recorded on both convex parts and concave parts of the guide grooves. The optical disk is compatible with an optical disk having uneven guide grooves with a depth of at least m λ/4n but less than (M+1)λ/4n. The optical disk according to the eighth structure comprises address areas where positions of the guide grooves are identified. Each address area comprises an area where convex-part recording- and reproducing-information is recorded and an area where concave-part recording- and reproducing-information is recorded. The convex-part recording- and reproducing-information is recorded in the area where concave-part recording- and reproducing-information is recorded in an optical disk having a groove depth of at least mλ/4n but less than (M+1)λ/4n. The concave-part recording- and reproducing-information is recorded in the area where convex-part recording- and reproducing-information is recorded in an optical disk having a groove depth of at least mλ/4n but less than (M+1)λ/4n.

According to the optical disk of the seventh or eighth structure mentioned above, recording- and reproducing-information to be recorded in the control area or in the address area is recorded in a specific area. Therefore, in an optical disk device for conventional optical disks provided with guide grooves having a depth of at least mλ/4n but less than (M+1)λ/4n (hereafter also referred to as a "conventional optical disk device"), the conditions for recording information on and reproducing information from land tracks or groove tracks of the optical disks provided with guide grooves having a depth of at least (M+1)λ/4n but less than (m+2)λ/4n of the present invention can be correctly set.

In other words, when recording and reproducing information by a conventional optical disk device, the polarity of a tracking signal is inverted due to the difference in groove depth and therefore the track to be scanned is reversed. Consequently, when a groove track should be scanned, a land track is scanned, and when a land track should be scanned, a groove track is scanned. However, according to the present invention, even in such a case, recording- and reproducing-conditions of a land track or a groove track that should be actually scanned can be read correctly from the optical disks. Therefore, recording- and reproducing-conditions according to the track to be scanned are set.

As a result, information can be recorded on or recorded information can be reproduced from the optical disks of the present invention whose depth is different from that of conventional optical disks without any change in a conventional optical disk device.

In order to attain the third object mentioned above, optical disks of the present invention have the following structures.

An optical disk according to a ninth structure of the present invention comprises a substrate on which uneven guide grooves are provided. The uneven guide grooves have a depth of at least (M+1)λ/4n but less than (m+2)λ/4n, wherein λ is a wavelength of a laser beam used for recording or reproduction, n indicates the refractive index of the substrate, and m is 0 or a positive even number. In the optical disk, signals are recorded on both convex parts and concave parts of the guide grooves. The optical disk comprises address areas where positions of the guide grooves are identified. Prepits provided in the address areas have a height or depth of at least mλ/4n but less than (m+1)λ/4n.

According to the optical disk of the ninth structure mentioned above, the grooves of an information track have a depth of at least (M+1)λ/4n but less than (m+2)λ/4n, but the prepits in the address areas have a height or depth of at least mλ/4n but less than (M+1)λ/4n. Therefore, in a conventional optical disk device, when recording information on or reproducing information from the optical disk of the present invention, the polarity of an output signal of a differential amplifier is not inverted in the address areas. Consequently, when reading out information recorded in the address areas of the optical disk according to the present invention using a conventional optical disk device, the obtained information is compatible with the information obtained from a conventional optical disk. Thus, the information can be used without any change.

An optical disk according to a tenth structure of the present invention comprises a substrate on which uneven guide grooves are provided. The uneven guide grooves have a depth of at least (m+1)λ/4n but less than (m+2)λ/4n, wherein λ is a wavelength of a laser beam used for recording or reproduction, n indicates the refractive index of the substrate, and m is 0 or a positive even number. In the optical disk, signals are recorded on both convex parts and concave parts of the guide grooves. An address area where the position of the guide groove is identified is provided between the guide grooves along a track. The address area comprises first prepits and second prepits. The first prepits are shifted to the peripheral side in the radial direction by about a ½ track pitch with respect to the track of the guide groove. The second prepits are shifted to the inner-circumference side in the radial direction by about a ½ track pitch with respect to the track of the guide groove. The sequence of the first prepits and the second prepits in a scanning direction when scanning a convex part of the guide groove right after the address area is different from that when scanning a concave part of the guide groove right after the address area.

According to the optical disk of the tenth structure mentioned above, in the case where the prepits in the radial direction are arranged reversely compared to that in a conventional optical disk provided with guide grooves having a depth of at least $m\lambda/4n$ but less than $(M+1)\lambda/4n$, using a conventional optical disk device, it can be correctly determined whether the track following the address area is a convex part or a concave part. That is, with respect to the information indicating whether the track following the address area is a convex part or a concave part, the compatibility with a conventional optical disk can be kept.

DETAILED DESCRIPTION OF THE INVENTION

Optical disk devices and optical disks of the present invention will be explained based on the drawings as follows.

Embodiment 1

An optical disk device and an optical disk according to Embodiment 1 for attaining the first object of the present invention will be explained as follows.

Figure 1:
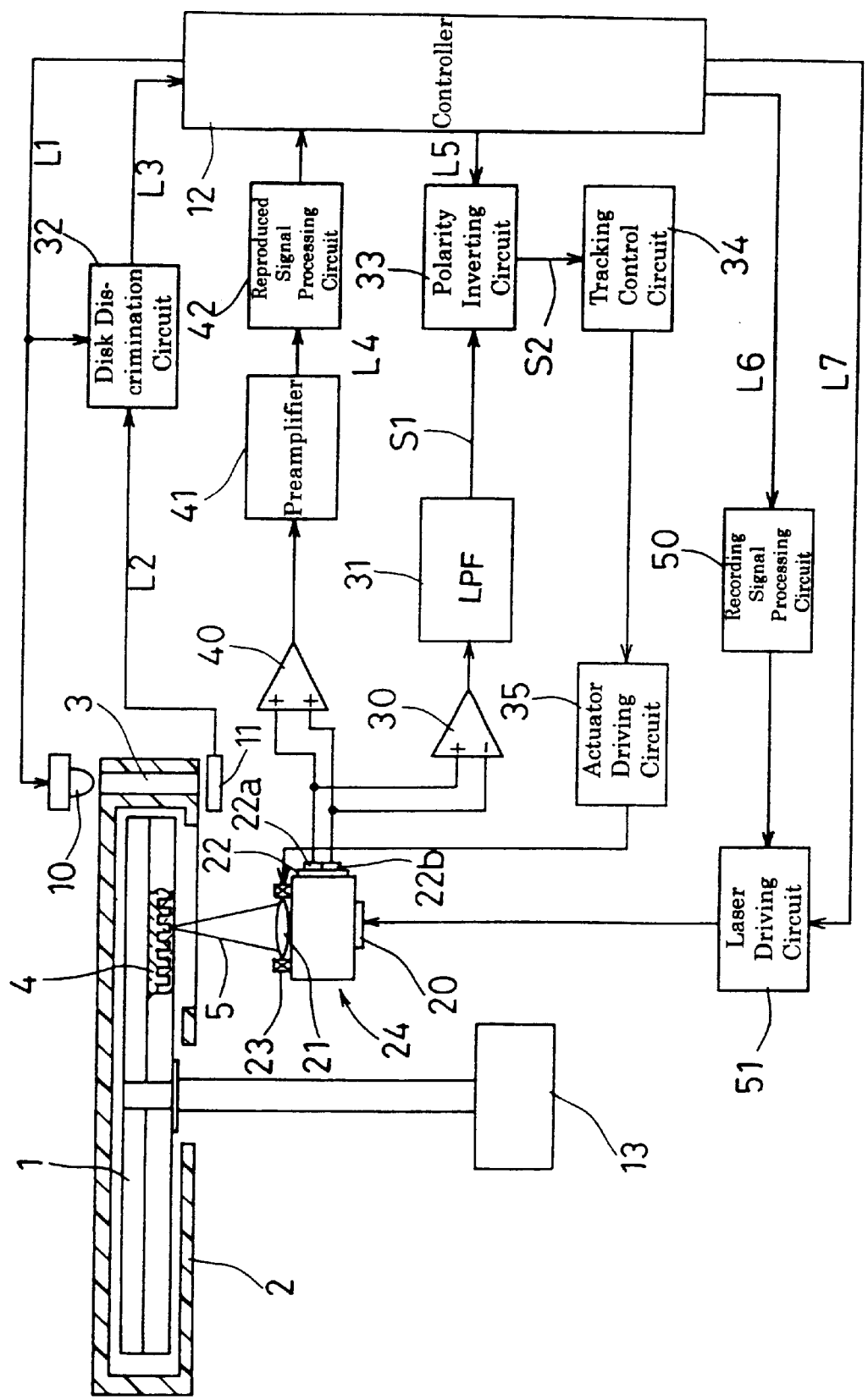
FIG. 1 is a schematic block diagram of an optical disk device according to Embodiment 1 of the present invention.

FIG. 1 is a block diagram of the optical disk device according to this embodiment.

An optical disk 1 is provided with a recording layer, a dielectric layer, a reflective layer, and the like sequentially. In order to record information, the recording layer absorbs laser beams and its state is changed. The dielectric layer protects the recording layer. The reflective layer reflects the laser beams. The optical disk 1 further comprises uneven information tracks (guide grooves) 4. The information tracks 4 comprise groove parts and land parts. In this embodiment, two types of optical disks that are different each other in the groove depth of the guide grooves of the information tracks are considered as the optical disk 1. In a first optical disk, grooves of the information track 4 have a depth of at least 0 but less than $\lambda/4n$ and in a second optical disk, grooves of the information track 4 have a depth of at least $\lambda/4n$ but less than $\lambda/2n$, wherein $\lambda$ is a wavelength of a laser beam and n indicates the refractive index of a substrate comprised in the optical disk 1.

The optical disk 1 is contained in a cartridge 2 so that the disk surface is protected and the like. The cartridge 2 is formed of a material such as a resin. The cartridge 2 has an identification hole 3. In this embodiment, the identification hole 3 is closed when the first optical disk is contained in the cartridge 2 and is opened when the second optical disk is contained in the cartridge 2.

A light emitting diode 10 provided in an optical disk device is arranged so as to be located above the identification hole 3 when the optical disk 1 is put into the optical disk device of this embodiment. A photodetector 11 is arranged at the position opposing the light emitting diode 10, wherein the cartridge 2 is located between the photodetector 11 and the light emitting diode 10.

When the cartridge 2 containing the optical disk 1 is installed in the optical disk device, a controller 12 outputs a signal L1 to light up the light emitting diode 10. A light emitted from the light emitting diode 10 passes through the identification hole 3 and enters the photodetector 11, thus being converted to an electric signal L2. A disk discrimination circuit 32 detects the signal L1 that switches the light emitting diode 10 on or off and the signal L2 from the photodetector 11. Then the disk discrimination circuit 32 discriminates the type of the disk, thus outputting an output signal L3 thereby obtained to the controller 12.

In the present embodiment, the identification hole 3 is designed so that its switching condition (opened or closed) is changed corresponding to the groove depth of the information track 4. For instance, the identification hole 3 is designed so that the identification hole 3 is closed (the signal L2 is 0) when the first optical disk having a groove depth of at least 0 but less than $\lambda/4n$ is contained in the cartridge 2, and the identification hole 3 is opened (the signal L2 is 1) when the second optical disk having a groove depth of at least $\lambda/4n$ but less than $\lambda/2n$ is contained in the cartridge 2. As a result, the disk discrimination circuit 32 outputs the signal L3 to the controller 12. The signal L3 conveys positive polarity when the first disk is contained in the cartridge 2 and conveys negative polarity when the second disk is contained in the cartridge 2.

A laser driving circuit 51 receives a signal L7 from the controller 12 to be changed to a reproducing mode and outputs a driving current to a semiconductor laser 20, which results in emission at a constant reproducing intensity.

Next, the position of a beam spot in a focus direction is controlled. For that purpose, a general focus controlling method such as a spot size method or an astigmatism method may be used. Therefore, no detailed explanation of the method is necessary herein.

A laser beam emitted from the semiconductor laser 20 is focused on the information track 4 as a beam spot 5 by an objective lens 21. A laser beam reflected from the information track 4 is diffracted or changed in reflected-light quantity by recording marks or address pits. As a result, the reflected light enters a two-division photodetector 22.

Light receivers 22a and 22b in the photodetector 22 convert the change in the light quantity of the incident optical beam into electric signals. Each of the light receivers 22a and 22b outputs the electric signals to a differential amplifier 30 and a summing amplifier 40. After converting each input current into voltage, the differential amplifier 30 outputs a differential signal obtained by the differentiation to a LPF 31. The LPF 31 extracts a low-frequency component from the differential signal and outputs it as a signal S1 to a polarity inverting circuit 33.

In this case, suppose that the signal S1 is output with positive polarity if the groove depth is at least 0 but less than $\lambda/4n$ (the first optical disk), then the signal S1 is output with negative polarity due to the light-phase inversion at the groove depth of $\lambda/4n$ if the groove depth is at least $\lambda/4n$ but less tha $\lambda/2n$ (the second optical disk).

The controller 12 discriminates the groove depth of the information track 4 according to the signal L3 of the disk discrimination circuit 32. When the controller 12 finds the first optical disk, the controller 12 outputs a control signal L5 into the polarity inverting circuit 33 so that the polarity inverting circuit 33 passes the signal S1 without polarity change when tracking a groove track and inverts the polarity of the signal S1 when tracking a land track. When the controller 12 finds the second optical disk according to the signal L3, the controller 12 outputs a control signal L5 into the polarity inverting circuit 33 so that the polarity inverting circuit 33 inverts the polarity of the signal S1 when tracking a groove track and passes the signal S1 without polarity change when tracking a land track. The polarity inverting circuit 33 as a polarity inverting system of the present invention outputs a signal S2 obtained by inverting the polarity of the signal S1 according to the signal L5 into a tracking control circuit 34.

The signal S2 is a so-called push-pull signal and corresponds to the tracking error quantity between the beam spot 5 and the information track 4.

The tracking control circuit 34 outputs a tracking driving signal to an actuator driving circuit 35 according to the level and the polarity of the input signal S2. The actuator driving circuit 35 outputs a driving current to an actuator 23 according to the tracking driving signal, thus shifting the objective lens 21 in the direction crossing the information tracks 4.

By the above-mentioned control, even in the case of reproducing information from disks, each of which has a different groove depth, land tracks and groove tracks can be tracked correctly by providing the identification hole 3 formed in the cartridge as an optical disk discriminator and a detector that determines the opened or closed status of the identification hole 3.

When the beam spot 5 scans the information tracks 4 correctly, the reflected-light quantity or light-quantity distribution is changed corresponding to prepits 604 and recording marks 605 (see FIG. 8), thus changing the levels of the output signals of the light receivers 22a and 22b. These output signals are added in the summing amplifier 40 to obtain a summed signal, and the summed signal is output to a preamplifier 41. The signal amplified by the preamplifier 41 is demodulated to reproduced data by a reproduced signal processing circuit 42. The reproduced data is output to the controller 12.

On the other hand, in recording, the laser driving circuit 51 is changed to a recording mode by receiving a signal L7 from the controller 12. At the same time, a recording signal processing circuit 50 receives a recording data signal L6 from the controller 12 and outputs a modulating signal to the laser driving circuit 51. The laser driving circuit 51 modulates a driving current output to the semiconductor laser 20 according to the modulating signal. Thus, the intensity of the beam spot 5 is changed and recording marks are formed on the information tracks 4.

During each operation mentioned above, a spindle motor 13 rotates the optical disk 1 at a constant angular or linear velocity.

As mentioned above, according to the present embodiment, the polarity of the output signal S1 of the differential amplifier 30 is inverted suitably according to the control signal L5 of the controller 12 based on the information about the groove depth of the information track 4. Therefore, even if an optical disk having a different groove depth for the information track 4 is put into an optical disk device, a target land track or a target groove track can be tracked constantly and correctly. As a result, information can be recorded on the target land track or the target groove track, or information recorded on the target land track or the target groove track can be reproduced.

In the present embodiment, the two types of disks are used as examples, one of which has a groove depth of at least 0 but less than $\lambda/4n$ (the first optical disk) and the other has a groove depth of at least $\lambda/4n$ but less than $\lambda/2n$ (the second optical disk). However, the inversion of a tracking signal amplitude to positive or negative is repeated at a $\lambda/2n$ period. Therefore, even in a disk having a groove depth of at least $\lambda/2n$, the control should be operated separately in two types of optical disks, one of which has a groove depth of at least $m\lambda/4n$ but less than $(m+1)\lambda/4n$ and the other has a groove depth of at least $(m+1)\lambda/4n$ but less than $(m+2)\lambda/4n$, wherein m is 0 or a positive even number.

Furthermore, in the present embodiment, the identification hole 3 provided in the cartridge 2, the light emitting diode 10, and the photodetector 11 are used as an example of the groove-depth discrimination system. However, the present invention is not limited to this.

For instance, instead of the identification hole 3, the information about the guide-groove depth may be recorded in a predetermined area of the cartridge 2 or in a predetermined area on the surface of the optical disk 1. Specifically, the predetermined area in the cartridge 2 or on the optical disk 1 is formed so that the reflectance of the predetermined area in the case of the first optical disk is different from that in the case of the second optical disk. The optical disk device may be set so that the first optical disk is identified by the reflectance of less than a certain value and the second optical disk by the reflectance of at least the certain value.

The optical disk device may be provided with a mechanical switch at a predetermined position in the cartridge 2 and may be set so that its on state corresponds to the first disk and its off-state corresponds to the second disk.

Further, there is a method in which the information about guidegroove depth is provided in a control area 61 shown in FIG. 2 described later in detail as uneven bits. In this method, at the time of putting an optical disk into the optical disk device, it is possible to discriminate its groove depth by reproducing the lead-in identification data in the control area 61. Moreover, in this case, even if the optical disk 1 has a plurality of zones in the radial direction and the groove depth varies depending on these zones, the groove depth in each zone can be discriminated by recording the information about the radial position and the groove depth of each zone.

Figure 2:
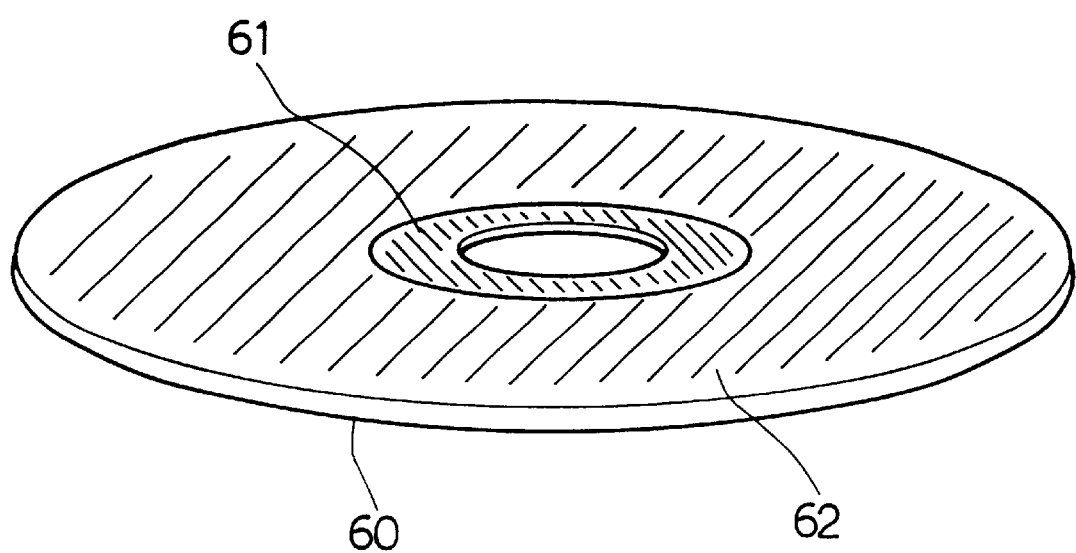
FIG. 2 is a schematic perspective view of an optical disk according to Embodiment 2 of the present invention.
Figure 8:
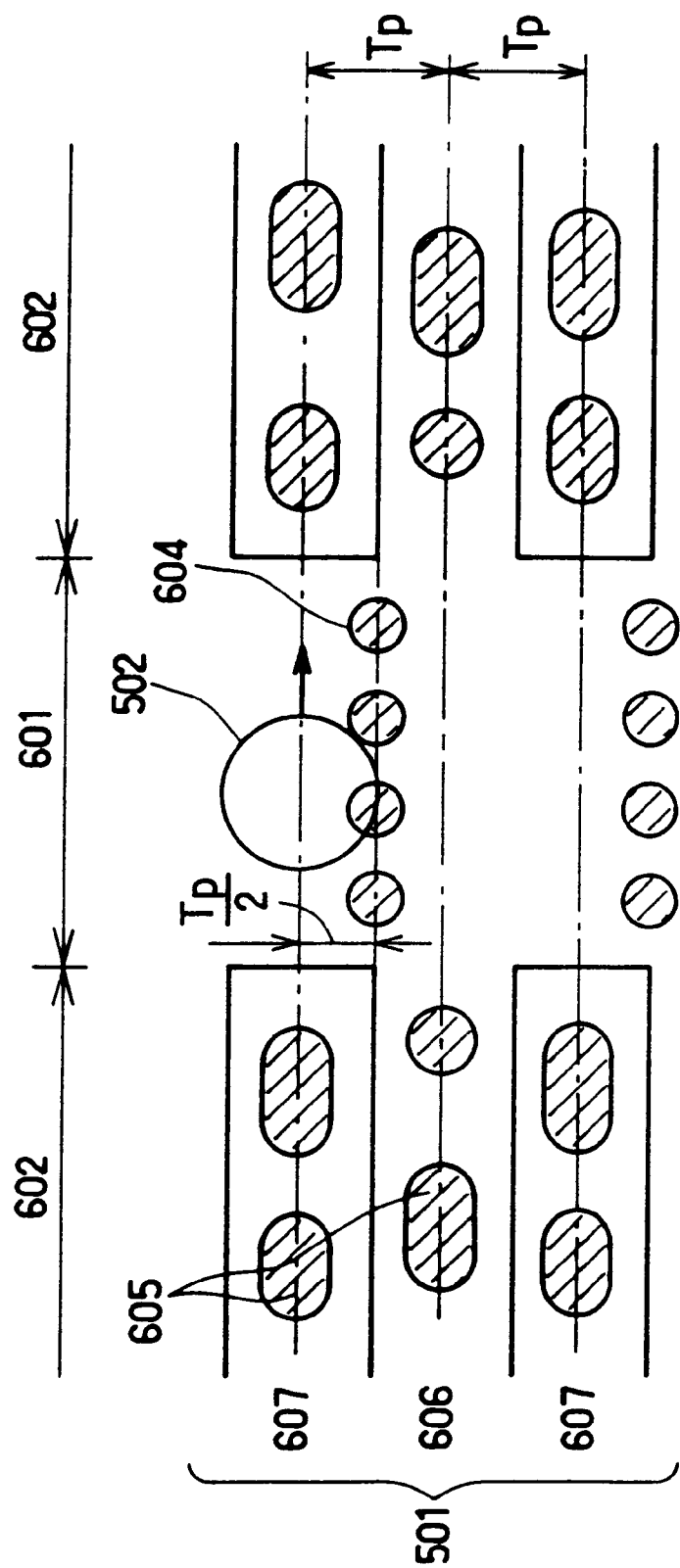
FIG. 8 is an enlarged plan view showing an example of information tracks on the optical disk shown in FIG. 6.

The information about the groove depth may be recorded in address area 601 in FIG. 8 instead of the control area 61 in FIG. 2. Also in this case, even if the optical disk 1 has a plurality of zones in the radial direction and the groove depth varies depending on these zones, the groove depth in each zone can be discriminated by recording the information about the groove depth in the address area in each zone.

As mentioned above, if the information about the guide-groove depth is recorded in an identifying signal area such as the control area and the address area on the optical disk, detectors such as the light emitting diode 10 and the photodetector 11 are not necessary in the optical disk device. In addition, even for an optical disk that is not contained in a cartridge, it is possible to obtain the information about its groove depth.

It also is possible to record information about the tracking polarity of the reproducing optical system in the optical disk device in the cartridge or in the control area or the address area on the optical disk instead of the information about the groove depth. For example, it can be recorded whether the polarity inverting circuit 33 transmits the signal S1 without polarity change or inverts the polarity of the signal S1 to transmit it. The optical disk device reads out this information and the tracking polarity can be set suitably. Therefore, tracking can be controlled so that a target groove track or a target land track is tracked correctly.

Furthermore, in the cartridge, or in the control area or in the address areas on the optical disk, information about an irradiation power of a laser beam irradiated onto an optical disk, information about the selection of a modulation pattern of the laser beam, or the like may by recorded in addition to the information mentioned above. The optical disk device reads out such information, and recording- and reproducing-conditions of the optical disk device can be suitably set.

Embodiment 2

An optical disk according to Embodiment 2 for attaining the first object of the present invention will be explained as follows. The optical disk of this embodiment has a groove depth of at least $(m+1)\lambda/4n$ but less than $(m+2)\lambda/4n$ and is compatible with conventional optical disks having a groove depth of at least $m\lambda/4n$ but less than $(M+1)\lambda/4n$.

FIG. 2 is a schematic perspective view of the optical disk according to this embodiment. The optical disk 60 of this embodiment comprises a control area (a ROM area exclusively for reproduction) 61 and a RAM area 62. In the control area 61, information about the type of the optical disk, recording- and reproducing-conditions, and the like are formed as uneven pits. In the RAM area 62, data of image information and the like are recorded and reproduced.

Figure 3:
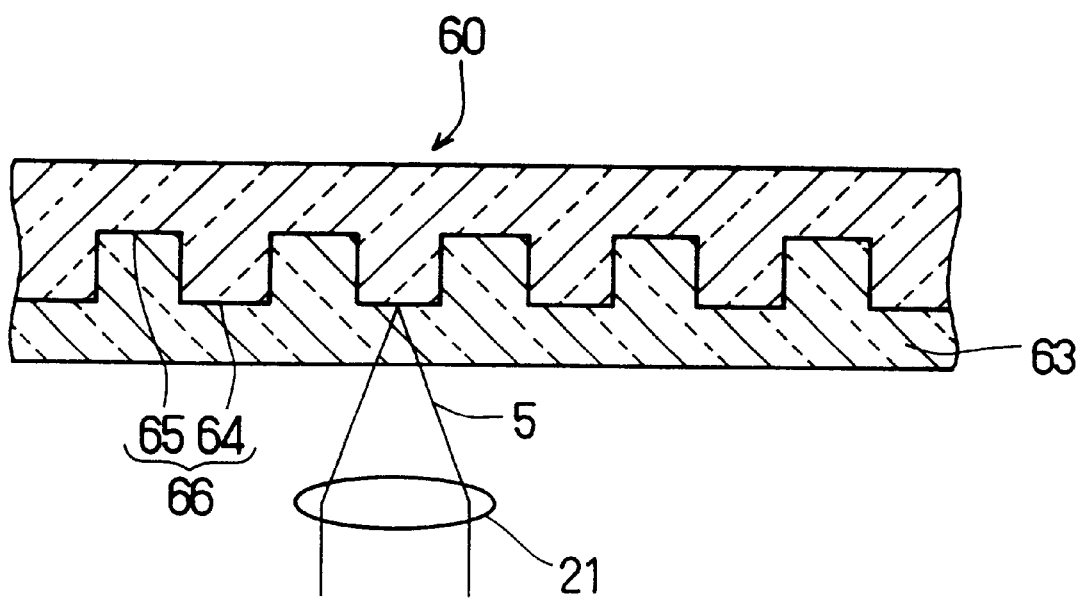
FIG. 3 is an enlarged partial cross sectional view in the radial direction of RAM area on the optical disk shown in FIG. 2.

FIG. 3 is an enlarged schematic view showing a part of the cross section in the thickness direction and taken in the radial direction of the RAM area 62 in FIG. 2. A substrate 63 is formed of a resin material such as polycarbonate, or a glass material, or the like. In the RAM area on the substrate 63, uneven information tracks 66 are formed. An information track 66 comprises a groove track 64 and a land track 65. In order to record information, the substrate 63 comprises a recording layer, a dielectric layer, a reflective layer, and the like sequentially. The recording layer absorbs laser beams, and its state is changed. The dielectric layer protects the recording layer. The reflective layer reflects the laser beams. The optical disk 60 is formed by laminating an over coat, a protecting plate, and the like (not shown in FIG. 3) thereon.

In the optical disk of the present embodiment, a laser beam 5 is irradiated onto the groove tracks 64 and the land tracks 65 of the information tracks 66 in the RAM area, thus recording and reproducing information. The recording- and reproducing-conditions of the RAM area 62 are determined by reading the conditions recorded in the control area 61 comprising the uneven pits shown in FIG. 2 in advance.

For example, in the control area 61, information indicating the tracking polarity when a beam spot scans the groove track 64 and the land track 65 of the information track 66 is recorded, or information about the groove depth of the information track 66 is recorded. Before recording and reproduction, an optical disk device reads such information, so that the optical disk device can scan a target groove track 64 or a target land track 65 correctly.

In the control area 61, information about an irradiation power of the laser beam 5 in recording also can be recorded in order to compensate for the thermal and optical characteristic difference generated between the groove track 64 and the land track 65. The optical disk device reads out this irradiation condition before recording and the recording condition is set.

In the control area 61, information about the selection of a modulation pattern in which the laser beam 5 is modulated in the case of recording on the groove track 64 or the land track 65 also can be recorded. The optical disk device reads out this condition before recording and the recording condition is set.

As described above, when putting the optical disk of this embodiment into an optical disk device, the optical disk device starts with reading out the information mentioned above recorded in the control area. Consequently, information can be recorded on or reproduced from a target groove track or a target land track stably.

Needless to say, it is also possible to record the entire information or a part of the information in the address area, which is recorded in the control area in the above description. When recording and reproducing information in a predetermined address, the optical disk device reads out such information recorded in the address area. Thus, tracking is controlled suitably in each address, and suitable recording- and reproducing-conditions can be set.

Embodiment 3

An optical disk according to Embodiment 3 for attaining the second object of the present invention will be explained as follows.

One of the objects of the present invention is to make an optical disk that has a groove depth of at least $\lambda/4n$ but less than $\lambda/2n$ and has compatibility with conventional optical disks having a groove depth of at least 0 but less than $\lambda/4n$. That is, one of the objects of the present invention is to provide an optical disk having a groove depth of at least $\lambda/4n$ but less than $\lambda/2n$ on which information can be recorded and from which information can be reproduced using a conventional optical disk device designed for conventional optical disks having a groove depth of at least 0 but less than $\lambda/4n$.

In other words, the optical disk having a groove depth of at least $\lambda/4n$ but less than $\lambda/2n$ of the present invention is required to be compatible with conventional optical disks having a groove depth of less than $\lambda/4n$ as to recording- and reproducing-conditions such as an irradiation power and a modulation pattern of laser beams for recording information on or reproducing the information from groove tracks and land tracks.

In order to attain the object mentioned above, the optical disk of the present invention has the following structure.

In the optical disk in the present embodiment, the same layer structure comprising a recording layer, a dielectric layer, a reflective layer, and the like as in Embodiment 2 may be used. Therefore, a detailed explanation is not necessary.

In a control area 61 of a conventional optical disk having a groove depth of at least 0 but less than $\lambda/4n$, suppose that an area where groove-track recording- and reproducing-information is recorded is a groove information recording area A, and an area where land-track recording- and reproducing-information is recorded is a land information recording area B. In this case, the recording- and reproducing-information that should be recorded includes, for example, information on the irradiation power of a beam spot 403 (FIG. 4) when recording information on an information track, information on the selection of a modulation pattern of the beam spot 403, or the like.

On the other hand, in the optical disk of the present embodiment having a groove depth of at least $\lambda/4n$ but less than $\lambda/2n$, information about the land-track recording- and reproducing-conditions is recorded in the groove information recording area A (where groove-track recording- and reproducing-information is recorded in an optical disk having a groove depth of at least 0 but less than $\lambda/4n$) and information about the groove-track recording- and reproducing-conditions is recorded in the land information recording area B (where land-track recording- and reproducing-information is recorded in an optical disk having a groove depth of at least 0 but less than $\lambda/4n$) in the control area 61.

As a result, the inversion of tracking polarity according to the guide-groove depth can be compensated. Therefore, information can be recorded on and reproduced from the optical disk having a groove depth of at least $\lambda/4n$ but less than $\lambda/2n$ of the present invention using conventional optical disk devices.

A method of recording information on and reproducing information from the optical disk of the present embodiment will be explained in detail as follows.

Figure 7:
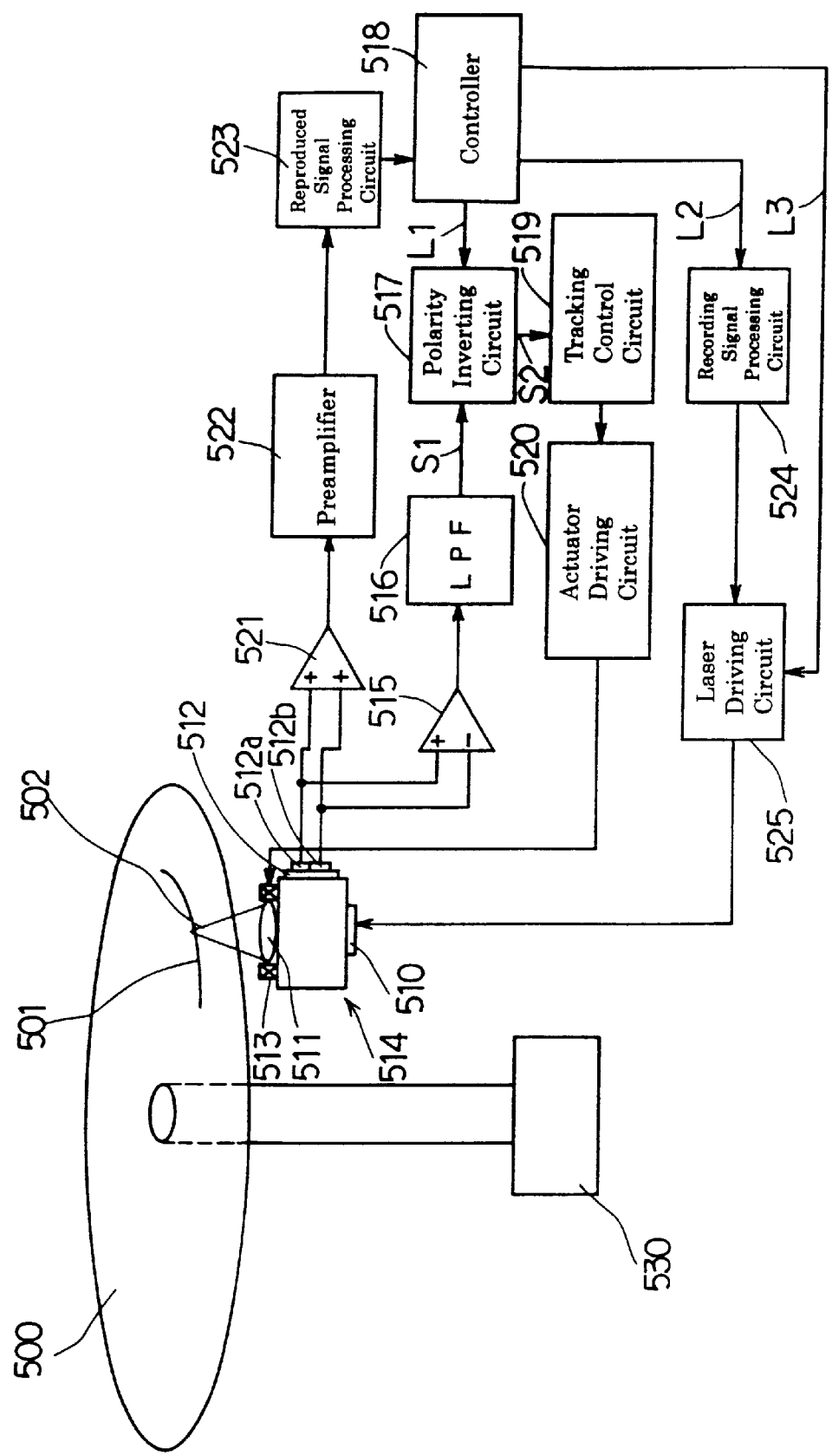
FIG. 7 is a schematic block diagram of a conventional optical disk device.

Since the optical disk 60 is compatible with optical disks having a groove depth of at least 0 but less than $\lambda/4n$, such a conventional optical disk device as shown in FIG. 7 may be used for recording information on and reproducing information from the optical disk 60. After being put on a spindle motor 530, the optical disk rotates at a predetermined number of rotations. An optical beam is emitted from an optical head 514 and a beam spot 502 is focused on the control area (a ROM area) 61 (see FIG. 2) of an optical disk 500. A laser beam reflected from the control area 61 enters a light receiver 512 in the optical head 514 and is converted into a electric signal. This electric signal goes through a summing amplifier 521, a preamplifier 522, and a reproduced signal processing circuit 523, thus being converted into a signal reproduced from the control area 61. According to this reproduced signal, recording- and reproducing-conditions about, for example, type-determination of the optical disk 500, an irradiation power and a modulating pattern of groove tracks 64 and land tracks 65 in a RAM area 62 are set in the optical disk device.

Next, reference will be made to the case of recording information in or reproducing the information from the RAM area 62 of the optical disk.

First, the case of reproducing information on conventional optical disks comprising an information track with a groove depth of less than $\lambda/4n$ will be explained.

When reproducing information recorded on a groove track of the optical disk, reproducing-information about the groove track recorded in a groove information recording area A is read out in the first place. Then a predetermined groove track is tracked. Since a polarity inverting circuit 517 transmits a signal S1 without polarity change, the beam spot 502 can track the groove track. Thus, the information recorded on the groove track can be reproduced under the reproducing conditions based on the reproducing-information about the groove track that has been read in advance.

On the other hand, when reproducing information recorded on a land track, reproducing-information about the land track recorded in a land information recording area B is read out in the first place. Then, a predetermined land track is tracked. Since the polarity inverting circuit 517 inverts the polarity of the signal S1, a beam spot 502 can track the land track. Thus, information recorded on the land track can be reproduced under the reproducing conditions based on the reproducing-information about the land track that has been read in advance.

The following description is directed to the reproduction of information recorded on the optical disk 60 comprising an information track 66 having a groove depth of at least $\lambda/4n$ but less than $\lambda/2n$ of the present embodiment using the conventional optical disk shown in FIG. 7. In this case, the signal amplitude of the tracking signal S1 is reversed to positive or negative at $\lambda/4n$ as explained above in the description of FIG. 9.

Figure 9:
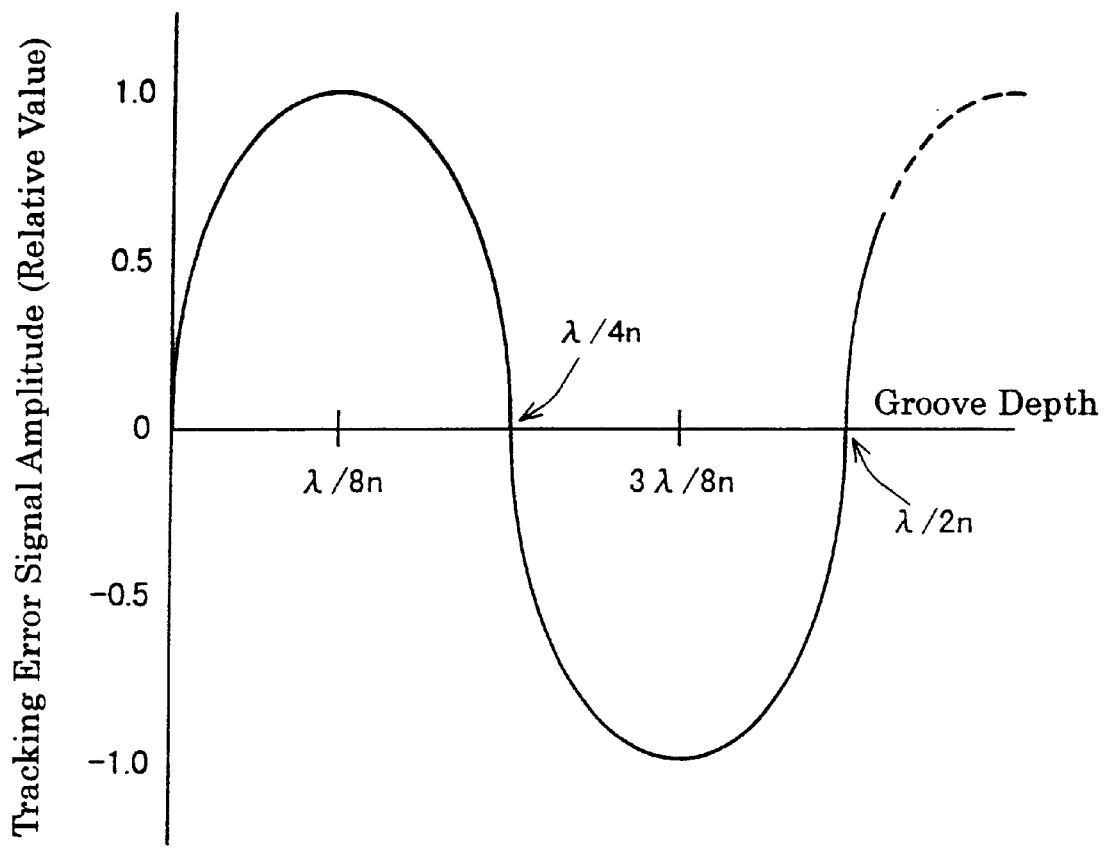
FIG. 9 shows the relationship between the depth of guide grooves and the amplitude of a tracking error signal.

However, in the optical disk of the present embodiment, information about the land track is recorded in the groove information recording area A and information about the groove track is recorded in the land information recording area B in the control area 61 as described above. Therefore, for example, when trying to reproduce information recorded on a groove track, the optical disk device reads the information recorded in the groove information recording area A. However, the information that is actually read by the optical disk device is reproducing-information about a land track. Therefore, in the optical disk device, various reproducing conditions are set based on this information. As a next step, the optical disk device tries to track the groove track in a predetermined address. However, as shown in FIG. 9, the polarity of the tracking signal S1 is inverted, and therefore the land track is tracked actually. Consequently, the optical disk device reproduces the information recorded on the land track based on the reproducing-information about the land track that has been read in advance.

Similarly, when trying to reproduce the information recorded on a land track, the optical disk device reproduces the information recorded on a groove track based on the reproducing-information about the groove track that has been read out from the control area in advance.

Thus, even if the tracking polarity is inverted, when tracking a land track, the land track can be tracked based on the land-track recording- and reproducing-information, and when tracking a groove track, the groove track can be tracked based on the groove-track recording- and reproducing-information. That is, when recording information on and reproducing information from the optical disk of the present embodiment using a conventional optical disk device, the recording- and reproducing-conditions about a scanning track are correctly set.

As a result, according to the optical disk of the present embodiment, an optical disk device recognizes the information about a groove track recorded in the control area as the information about a land track and the information about a land track recorded in the control area as the information about the groove track. Therefore, in the optical disk provided with guide grooves having a depth of at least $\lambda/4n$ but less than $\lambda/2n$ of the present embodiment, the same tracking operation as in a optical disk having a groove depth of at least 0 but less than $\lambda/4n$ can be performed. Similarly, in setting recording conditions, according to the optical disk provided with guide grooves having a depth of at least $\lambda/4n$ but less than $\lambda/2n$ of the present embodiment, the recording-information for recording information on a groove track is recorded in the land information recording area B and the recording information for recording information on a land track is recorded in the groove information recording area A. Therefore, it is possible to record information under the recording conditions about the track that is actually tracked.

Thus, in the conventional optical disk device (see FIG. 7) designed for optical disks having a groove depth of less than $\lambda/4n$, the inversion of tracking polarity due to the groove depth of at least $\lambda/4n$ but less than $\lambda/2n$ on the optical disk of the present invention can be compensated. Therefore, it is possible to record information on both lands and grooves suitably and to reproduce information recorded on both lands and grooves suitably. As a result, the compatibility with optical disks having a groove depth of less than $\lambda/4n$ can be ensured.

In the above example, the compatibility with conventional disks is ensured by manipulating the recording area of recording- and reproducing-information recorded in the control area 61. However, the compatibility can be also ensured by manipulating the information recorded not in the control area but in an address area. An example of this case is described as follows.

In the optical disk of the present embodiment, the address area of the optical disk is formed in a predetermined manner. The following description is directed to a method of forming the address area of the optical disk according to the present embodiment that is compatible with optical disks comprising an information track having a groove depth of at least 0 but less than $\lambda/4n$.

Figure 4:
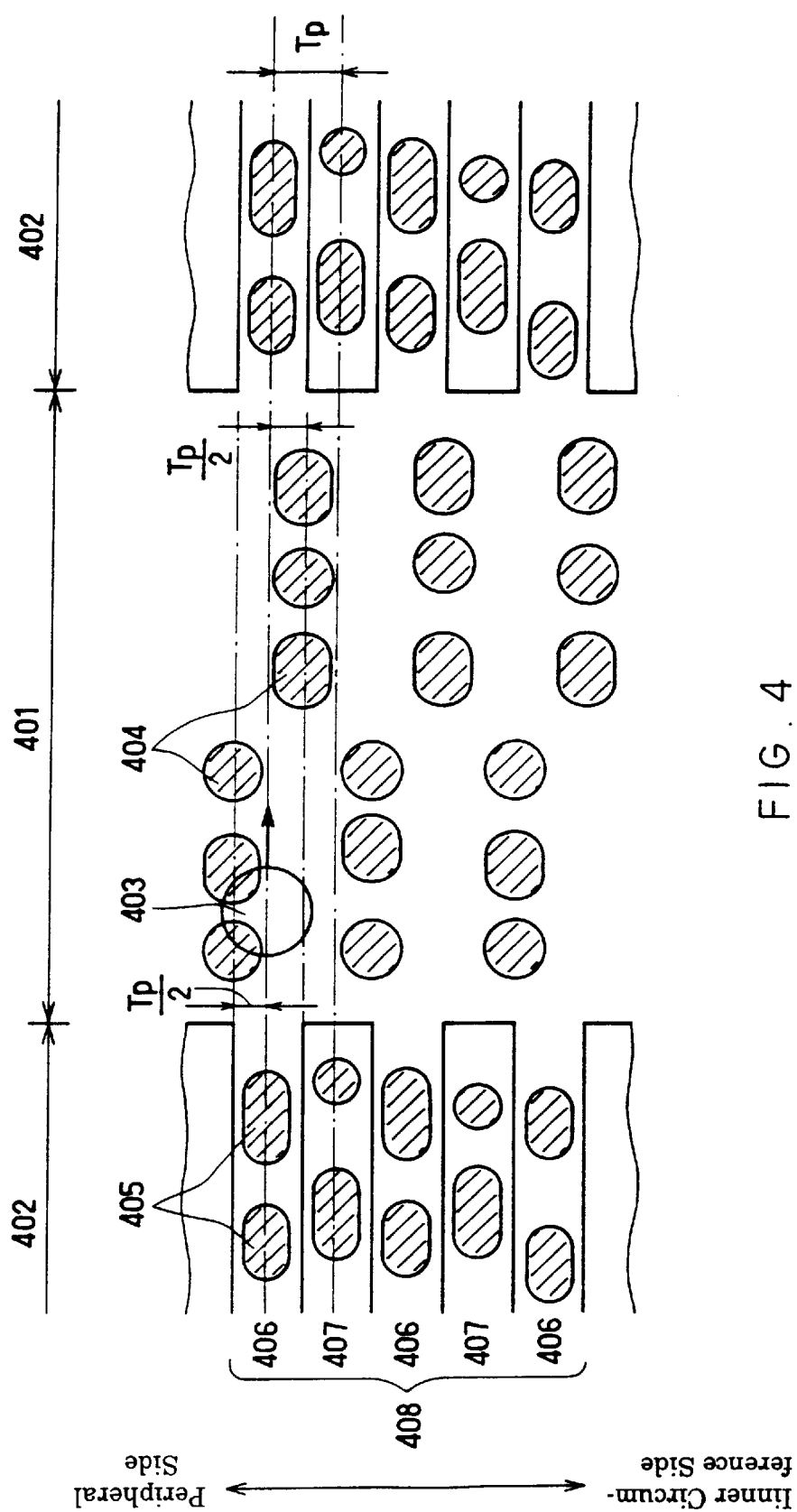
FIG. 4 is an enlarged plan view showing an example of information tracks on an optical disk according to Embodiment 3 of the present invention.

FIG. 4 is an enlarged partial view of an example of the information track on an optical disk according to the present embodiment. An address is formed, for example, as strings of uneven prepits 404 in an address area 401. FIG. 4 includes data areas 402, recording marks 405, groove tracks 406, and land tracks 407.

In order to ensure the compatibility with optical disks comprising information tracks 408 having a groove depth of less than $\lambda/4n$ as to tracking polarity, in the optical disk having a groove depth of at least $\lambda/4n$ but less than $\lambda/2n$ of the present invention, when the information track 408 to be scanned by a beam spot 403 is the land track 407, the groove-track recording- and reproducing-information is recorded in the address area directly before the land track 407, and when the information track 408 to be scanned is the groove track 406, the land-track recording- and reproducing-information is recorded in the address area directly before the groove track 406.

For example, when trying to reproduce information recorded on the groove track 406, a conventional optical disk device reads out the reproducing-information recorded in the address area directly before the groove track. However, the information actually read by the optical disk device is land-track recording- and reproducing-information. Under the read reproducing-conditions, the optical disk device tries to reproduce the information recorded on the groove track following the address. However, as shown in FIG. 9, since the polarity of the tracking signal S1 is inverted, actually the land track 407 is tracked. Therefore, the optical disk device reproduces information recorded on the land track 407 based on the land-track reproducing-information that has been read in advance.

Thus, even if the tracking polarity is inverted, when tracking a land track, the land track can be tracked based on the land-track recording- and reproducing-information, and when tracking a groove track, the groove track can be tracked based on the groove-track recording- and reproducing-information. That is, when recording information on and reproducing information from the optical disk in the present embodiment using a conventional optical disk device, information such as recording- and reproducing-conditions of a scanning track and the like are correctly set.

As a result, in the conventional optical disk device (see FIG. 7) designed for optical disks having a groove depth of less than $\lambda/4n$, the inversion of tracking polarity due to the groove depth of at least $\lambda/4n$ but less than $\lambda/2n$ on the optical disk of the present invention can be compensated. Thus, it is possible to record information on and reproduce information from both lands and grooves in an optimum condition. As a result, the compatibility with optical disks having a groove depth of less than $\lambda/4n$ can be ensured.

Information to be recorded in the address area 401 directly before the land or groove track as mentioned above may be information about an irradiation power of the beam spot 403, or information about the selection of a modulation pattern of the beam spot 403 when recording information on the information track.

In this embodiment, in the conventional optical disk having a groove depth of less than $\lambda/4n$, if the information about the groove-track recording- and reproducing-conditions is recorded in a groove information recording area A and the information about the land-track recording- and reproducing conditions is recorded in a land information recording area B, in the optical disk having a groove depth of at least $\lambda/4n$ but less than $\lambda/2n$ of the present invention, the information about the land-track recording- and reproducing-conditions is recorded in the groove information recording area A and the information about the groove-track recording- and reproducing-conditions is recorded in the land information recording area B. However, the present invention is not limited to this. In the optical disks having a groove depth of less than $\lambda/4n$, if the information about the land-track recording- and reproducing-conditions is recorded in the groove information recording area A and the information about the groove-track recording- and reproducing-conditions is recorded in the land information recording area B, in the optical disk having a groove depth of at least $\lambda/4n$ but less than $\lambda/2n$ of the present invention, the information about the groove track may be recorded in the groove information recording area A and the information about the land track may be recorded in the land information recording area B.

In this embodiment, reference was made to two types of disks, one of which has a groove depth of at least 0 but less than $\lambda/4n$ and the other has a groove depth of at least $\lambda/4n$ but less than $\lambda/2n$ as examples. However, the inversion of tracking signal amplitude to positive or negative is repeated at a $\lambda/2$ period. Therefore, even in disks having a groove depth at least $\lambda/2n$, the controls should be operated separately in two types of optical disks, one of which has a groove depth of at least $m\lambda/4n$ but less than $(m+1)\lambda/4n$ and the other has a groove depth of at least $(m+1)\lambda/4n$ but less than $(m+2)\lambda/4n$, wherein m is 0 or a positive even number.

Embodiment 4

An optical disk according to Embodiment 4 for attaining the third object of the present invention will be explained as follows.

In the optical disk described in the above embodiment, the prepits 404 formed in the address area 401 are formed generally so as to have the same height or depth as the depth of the information track 402. However, in an optical disk having a groove depth of at least $\lambda/4n$ but less than $\lambda/2n$ of this embodiment, prepits 404 formed in an address area 401 may be formed so as to have a height or a depth of less than $\lambda/4n$. That is, the grooves of an information track and the prepits in the address area are formed so as to be different in height or depth each other. As a result, in conventional optical disk devices, it can be correctly determined whether the track following the address is a land track or a groove track.

Figure 5:
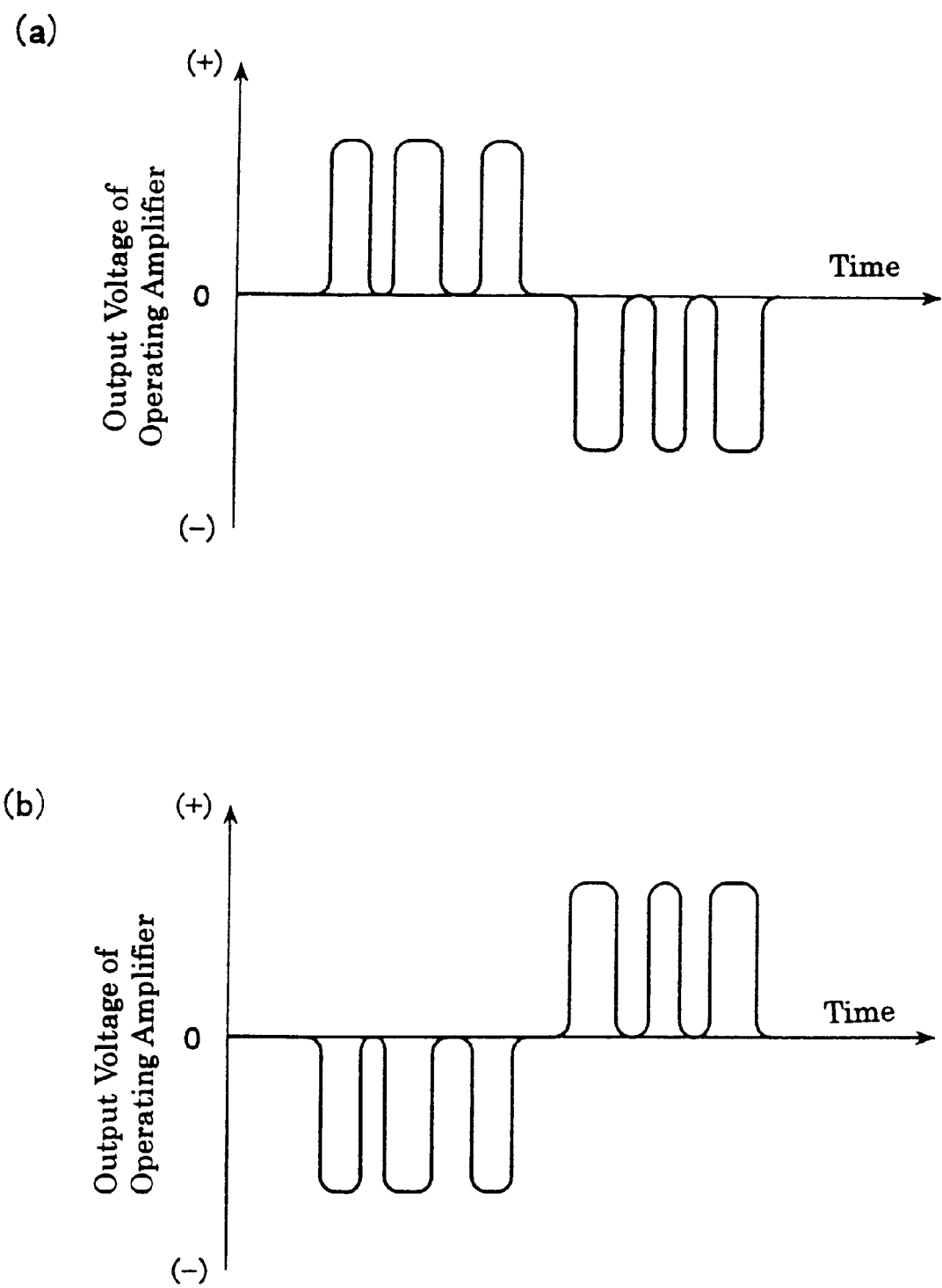
FIGS. 5(a)–(b) show an output signal of a differential amplifier.

FIG. 5 shows a signal of a differential amplifier 515 output when a beam spot 403 scans the address area 401 shown in FIG. 4. The prepits 404 in the address area 401 are not formed at the center of the scanning path of the beam spot 403. The prepits 404 are formed at the positions shifted in either radial direction with respect to the track by about Tp/2.

FIG. 5(*a*) shows an output signal of the differential amplifier when scanning the address area 401 directly before a groove track 406 by the beam spot 403 in the case where the prepits in the address area are formed so as to have a depth of less than $\lambda/4n$. In this example, when the prepits 404 are formed in the peripheral side of the optical disk with respect to the center line of the scanning path of the beam spot 403, an operation amplifier is set to output a positive output signal. When the prepits are formed at the inner circumference side, the operation amplifier is set to output a negative output signal.

On the other hand, when the prepits in the address area are formed so as to have a depth of at least $\lambda/4n$ but less than $\lambda/2n$, the output signal of the differential amplifier in the case of scanning the address area 401 directly before the groove track 406 by the beam spot 403 is shown in FIG. 5(*b*). This output signal corresponds to a signal obtained by reversing the polarity of the output signal shown in FIG. 5(*a*). Due to the difference in depth of the prepits formed in the address area, the polarity of the signal is inverted compared to the polarity of the signal shown in FIG. 5(*a*) by the effect described in the description of FIG. 9.

Conventionally, a well-known optical disk device is constructed so as to determine whether the information track following the address area is a groove track or a land track based on the sequence of negative polarity and positive polarity in the output signal of a differential amplifier when scanning an address area. In such an optical disk device, the track following the address area, i.e. a land track or a groove track, is determined reversely in two optical disks having completely the same plane prepit shape in an address area and having a different prepit depth each other.

However, when trying to record information on and reproduce information from the optical disk of the present invention comprising the information track 402 having a groove depth of at least $\lambda/4n$ but less than $\lambda/2n$ using conventional optical disk devices designed for optical disks having a groove depth of less than $\lambda/4n$, in the case of forming the prepits in the address area so as to have a depth of less than $\lambda/4n$, the polarity (positive or negative) of the signal amplitude of the tracking signal when scanning the address area is the same as that when scanning an address area of an optical disk having a groove depth of less than $\lambda/4n$. Consequently, it can be determined accurately whether the track following the address area is a land track or a groove track. That is, when reading out the information recorded in the address area using a conventional optical disk device, the obtained information is compatible with that obtained from a conventional optical disk and therefore can be used without any conversion.

Furthermore, information such as recording- and reproducing-conditions of the track following an address area in the address area may be recorded according to the manner explained in Embodiment 3. In this case, the recording- and reproducing-conditions recorded in the address area can be read out accurately using a conventional optical disk device as in optical disks having a groove depth of less than $\lambda/4n$.

Embodiment 5

An optical disk according to Embodiment 5 for attaining the third object of the present invention will be explained as follows.

The arrangement of prepits 404 forming an address area in FIG. 4 can be shifted in the radial direction of an optical disk according to the groove depth of an information track.

Figure 6:
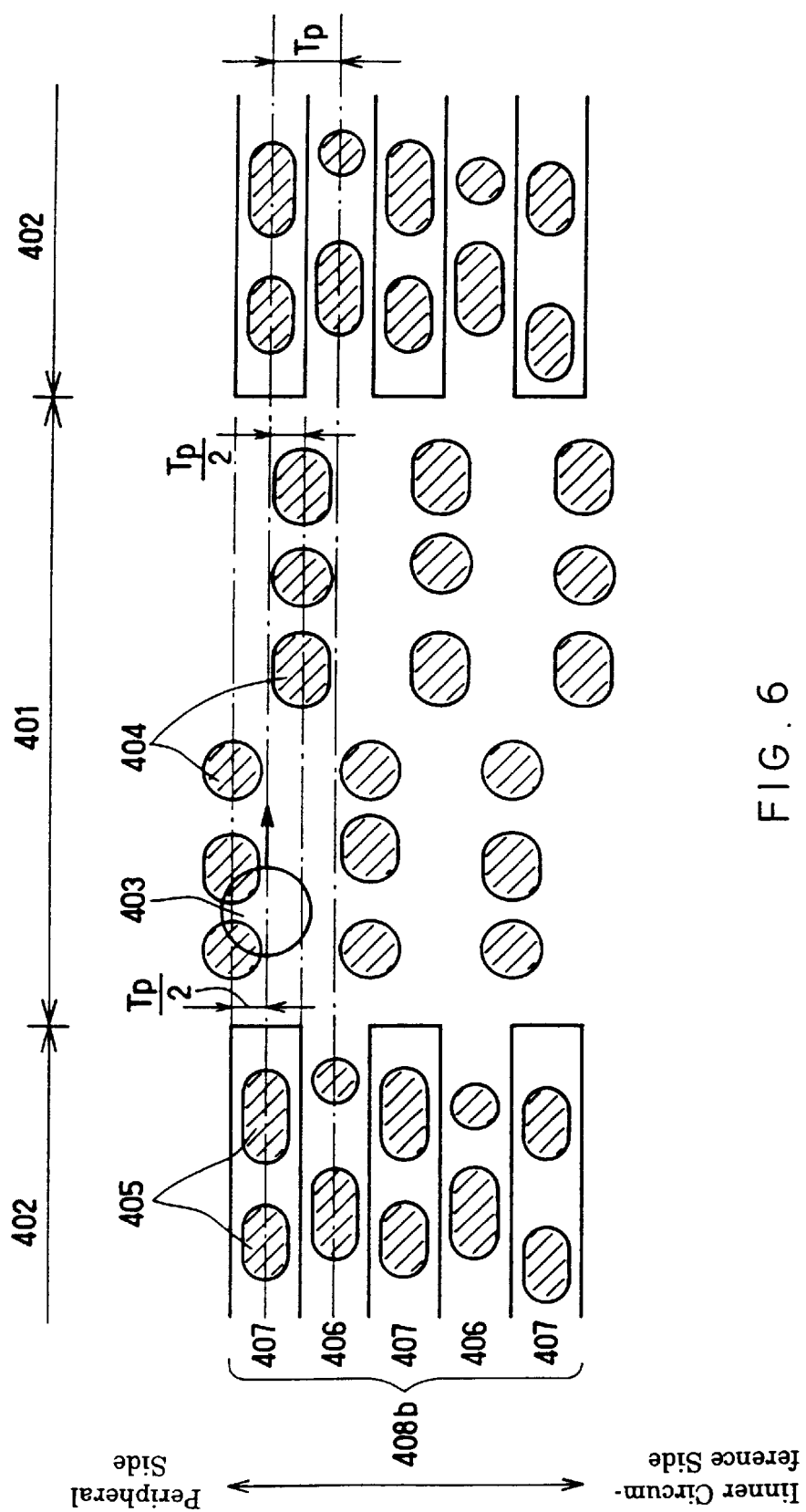
FIG. 6 is an enlarged plan view showing an example of information tracks on an optical disk according to Embodiment 5 of the present invention.

For example, as in FIGS. 4 and 6, the prepits 404 are arranged at the positions shifted in either radial direction with respect to a track by about Tp/2. In this case, the prepits shifted to the peripheral side in the radial direction are referred to as "first prepits". The prepits shifted to the inner-circumference side in the radial direction are referred to as "second prepits". The depth of the prepits is almost the same as the groove-depth of the information track.

In a conventional optical disk comprising an information track having a groove depth of at least 0 but less than $\lambda/4n$, as shown in FIG. 4, suppose that when the strings of the prepits 404 are arranged so that the string of the first prepits and the string of the second prepits are arranged sequentially in the running direction of a beam spot 403, the track following the strings of the prepits 404 is a groove track 406, and when the strings of the prepits 404 are arranged so that the string of the second prepits and the string of the first prepits are arranged sequentially in the running direction of the beam spot 403, the track following the strings of the prepits 404 is a land track 407. In this case, suppose that FIG. 5(*a*) shows the output signal of a differential amplifier in the case where the beam spot 403 scans the address area 401 directly before the groove track 406.

On the contrary, in the optical disk comprising an information track having a groove depth of at least $\lambda/4n$ but less than $\lambda/2n$ of the present embodiment, prepits 404 are arranged as shown in FIG. 6. That is, when the track following the strings of the prepits 404 is a groove track 406, the strings of the prepits 404 are arranged so that the string of the second prepits and the string of the first prepits are arranged sequentially in the running direction of the beam spot 403, and when the track following the strings of the prepits 404 is a land track 407, the strings of the prepits 404 are arranged so that the string of the first prepits and the string of the second prepits are arranged sequentially in the running direction of the beam spot 403. FIG. 5(*a*) shows the output signal of a differential amplifier in the case of scanning the address area 401 directly before the groove track 406 shown in FIG. 6 arranged in such a manner using the same optical disk device as that mentioned above. That is, the output signal obtained by scanning the address area directly before the groove track 406 of the optical disk of the present embodiment comprising the information track having a groove depth of at least $\lambda/4n$ but less than $\lambda/2n$ is the same as the output signal obtained by scanning the address area 401 directly before the groove track 406 of the conventional optical disk comprising an information track having a groove depth of at least 0 but less than $\lambda/4n$. This is because the arrangement of the prepits in the radial direction in the optical disk of the present embodiment is the reverse of that in the conventional optical disk, and further the polarity of the output signal of the differential amplifier is inverted due to the difference in depth of the prepits.

The configurations described above enable the polarity of the output amplitude of the tracking signal when scanning the address area on the optical disk of the present invention using a conventional optical disk device to be the same as that when scanning the address area on an optical disk having a groove depth of less than $\lambda/4n$. Therefore, it can be accurately determined whether the track following the address area is a land track or a groove track. That is, as to the information about whether the track following the address area is a land track or a groove track, the compatibility with conventional optical disks can be maintained.

Furthermore, information such as recording- and reproducing-conditions of the track following an address area in the address area may be recorded according to the manner explained in Embodiment 3. In this case, the recording- and reproducing-conditions recorded in the address area can be accurately read out using a conventional optical disk device as in optical disks having a groove depth of less than $\lambda/4n$.

Contrary to the above example, in a conventional optical disk having a groove depth of at least 0 but less than $\lambda/4n$, suppose that when the track following the address area is a groove track, the string of the second prepits and the string of the first prepits are arranged in the address area sequentially, and when the track following the address area is a land track, the string of the first prepits and the string of the second prepits are arranged in the address area sequentially. In this case, in the optical disk of the present invention, when the track following the address area is a groove track, the string of the first prepits and the string of the second prepits should be arranged in the address area sequentially, and when the track following the address area is a land track, the string of the second prepits and the string of the first prepits should be arranged in the address area sequentially.

In Embodiments 4 and 5 described above, the two types of disks are used as examples, one of which has a groove depth of less than $\lambda/4n$ and the other has a groove depth of at least $\lambda/4n$ but less than $\lambda/2n$. However, the inversion of tracking signal amplitude to positive or negative is repeated at a $\lambda/2n$ period. Therefore, even in a disk having a groove depth of at least $\lambda/2n$, the controls should be operated separately in two types of optical disks, one of which has a groove depth of at least $m\lambda/4n$ but less than $(M+1)\lambda/4n$ and the other has a groove depth of at least $(M+1)\lambda/4n$ but less than $(m+2)\lambda/4n$, wherein m is 0 or a positive even number.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An optical disk comprising a substrate on which uneven guide grooves are formed,
   wherein in an identifying signal area provided on the optical disk, information about the depth of the guide grooves and/or information about tracking polarity of a reproducing optical system for scanning a concave part of the guide grooves and information about tracking polarity of the reproducing optical system for scanning a convex part of the guide grooves are/is recorded.

2. The optical disk according to claim 1,
   wherein the identifying signal area is a control area.

3. The optical disk according to claim 1,
   wherein the identifying signal area is an address area where positions of the guide grooves are identified.

4. The optical disk according to claim 1,
   wherein the depths of the guide grooves vary depending on the positions, in the radial direction on the substrate.

5. The optical disk according to claim 1,
   wherein in the identifying signal area, information about an irradiation power of a laser beam irradiated and/or information about a modulation pattern of the laser beam irradiated are/is further recorded.

6. An optical disk comprising a substrate provided with uneven guide grooves having a depth of at least $(M+1)\lambda/4n$ but less than $(m+2)\lambda/4n$, where $\lambda$ is a wavelength of a laser beam used for recording or reproduction, n indicates the refractive index of the substrate, and m is 0 or a positive even number,
   wherein information about tracking polarity of the reproducing optical system for scanning a concave part of the guide grooves and information about tracking polarity of the reproducing optical system for scanning a convex part of the guide grooves is recorded in a control area of the optical disk.

7. An optical disk comprising a substrate provided with uneven guide grooves having a depth of at least $(M+1)\lambda/4n$ but less than $(m+2)\lambda/4n$, where $\lambda$ is a wavelength of a laser beam used for recording or reproduction, n indicates the refractive index of the substrate, and m is 0 or a positive even number,
   wherein information about the depth of the guide grooves is recorded in a control area of the optical disk.

8. The optical disk according to claim 6 or 7,
   wherein information about an irradiation power of a laser beam irradiated and/or information about a modulation pattern of the laser beam irradiated are/is further recorded in the control area.

9. An optical disk comprising a substrate provided with uneven guide grooves having a depth of at least $(m+1)\lambda/4n$ but less than $(m+2)\lambda/4n$, where $\lambda$ is a wavelength of a laser beam used for recording or reproduction, n indicates the refractive index of the substrate, and m is 0 or a positive even number,
   wherein the optical disk comprises address areas where positions of the guide grooves are identified, and information about tracking polarity of the reproducing optical system for scanning a concave part of the guide grooves and information about tracking polarity of the reproducing optical system for scanning a convex part of the guide grooves is recorded in the address areas.

10. An optical disk comprising a substrate provided with uneven guide grooves having a depth of at least $(M+1)\lambda/4n$ but less than $(m+2)\lambda/4n$, where $\lambda$ is a wavelength of a laser beam used for recording or reproduction, n indicates the refractive index of the substrate, and m is 0 or a positive even number,
    wherein the optical disk comprises address areas where positions of the guide grooves are identified, and information about the depth of the guide grooves is recorded in the address areas.

11. The optical disk according to claim 9 or 10,
    wherein information about an irradiation power of a laser beam irradiated and/or information about a modulation pattern of the laser beam irradiated are/is further recorded in the address areas.

12. The optical disk according to any one of claims 6, 7, 9, and 10,
    wherein the optical disk is compatible with an optical disk provided with uneven guide grooves having a depth of at least $m\lambda/4n$ but less than $(m+1)\lambda/4n$.

13. The optical disk according to claim 12,
    wherein the compatibility is compatibility as to tracking polarity, or an irradiation power or a modulation pattern of a laser beam when recording information on a convex part and/or a concave part of a guide groove.

14. An optical disk comprising a substrate provided with uneven guide grooves having a depth of at least $(M+1)\lambda/4n$ but less than $(m+2)\lambda/4n$, where $\lambda$ is a wavelength of a laser beam used for recording or reproduction, n indicates the refractive index of the substrate, and m is 0 or a positive even number, signals being recorded on both convex parts and concave parts of the guide grooves, wherein the optical disk comprises address areas where positions of the guide grooves are identified, and prepits provided in the address areas have a height or depth of at least $m\lambda/4n$ but less than $(m+1)\lambda/4n$.

* * * * *